US012665752B2

(12) United States Patent
King et al.

(10) Patent No.: US 12,665,752 B2
(45) Date of Patent: Jun. 23, 2026

(54) ADAPTIVE QUANTUM-BASED VOICE OVER INTERNET PROTOCOL (VoIP) SECURITY

(71) Applicant: Bank of America Corporation, Charlotte, NC (US)

(72) Inventors: Adam Kristian King, Fort Mill, SC (US); James Siekman, Charlotte, NC (US); Andrew S. Thomas, Hunt Valley, MD (US); Jada Williams, Hunt Valley, MD (US); Kevin Sweeney, Newark, DE (US); Ilya Goussev, Kennesaw, GA (US); Dawn Turner, Addison, TX (US); Robert James Hepp, Hunt Valley, MD (US); Charlene Gorter, Charlotte, NC (US); Crystine J. Peebles, Newark, DE (US); Tiara Rurey Fry, Denver, CO (US); Clara Fritts, Washington, DC (US)

(73) Assignee: Bank of America Corporation, Charlotte, NC (US)

( * ) Notice: Subject to any disclaimer, the term of this patent is extended or adjusted under 35 U.S.C. 154(b) by 104 days.

(21) Appl. No.: 18/947,048

(22) Filed: Nov. 14, 2024

(65) Prior Publication Data

US 2026/0155959 A1 Jun. 4, 2026

(51) Int. Cl.
*H04L 9/40* (2022.01)
*G10L 17/02* (2013.01)
(Continued)

(52) U.S. Cl.
CPC ............ *H04L 9/0852* (2013.01); *G10L 17/02* (2013.01); *G10L 21/0208* (2013.01);
(Continued)

(58) Field of Classification Search
CPC .. H04L 9/0852; H04L 9/3231; H04L 63/0861
See application file for complete search history.

(56) References Cited

U.S. PATENT DOCUMENTS

| | | | |
|---|---|---|---|
| 12,323,554 B1 * | 6/2025 | Fernandes | G06F 40/40 |
| 2002/0059516 A1 * | 5/2002 | Turtiainen | H04L 65/1069 |
| | | | 713/153 |

(Continued)

OTHER PUBLICATIONS

Popa QGP-VPN: QKD enhanced VPN solution for general-purpose encrypted communications Sep. 21-22, 2023 2023 22nd RoEduNet Conference: Networking in Education and Research (RoEduNet) (Year: 2023).*

*Primary Examiner* — David J Pearson
(74) *Attorney, Agent, or Firm* — Weiss & Arons LLP

(57) ABSTRACT

Systems, methods, and apparatus are provided for adaptive, quantum-based VoIP security. A biometric voiceprint may be generated from a VoIP communication. In response to failure to authenticate the voiceprint, the sound waves associated with the voiceprint may be selectively neutralized without terminating the VoIP communication. In response to authentication of the voiceprint, a biometric key may be generated based on the voiceprint. A quantum encryption key may be generated and distributed via a quantum channel. A VoIP session key may be generated based on the biometric encryption key and the quantum encryption key and used to encrypt the VoIP communication. An ambient sound associated with the VoIP communication may be isolated. In response to failure to authenticate the ambient sound, the caller may be required to provide an additional form of authentication.

21 Claims, 7 Drawing Sheets

(51) Int. Cl.
    *G10L 21/0208*     (2013.01)
    *H04L 9/08*     (2006.01)
    *H04L 9/32*     (2006.01)

(52) U.S. Cl.
    CPC .......... *H04L 9/0819* (2013.01); *H04L 9/0866* (2013.01); *H04L 9/3231* (2013.01); *H04L 63/0861* (2013.01)

(56)         References Cited

U.S. PATENT DOCUMENTS

| | | | |
|---|---|---|---|
| 2005/0063547 A1* | 3/2005 | Berzanskis ........... | H04L 9/0852 380/278 |
| 2006/0034287 A1* | 2/2006 | Novack ................. | H04W 12/08 713/168 |
| 2007/0157026 A1* | 7/2007 | Zimmermann ......... | H04M 3/16 713/171 |
| 2009/0217039 A1* | 8/2009 | Kurapati ............... | H04L 9/3273 713/168 |
| 2010/0008506 A1* | 1/2010 | Park ...................... | H04L 9/3231 380/255 |
| 2020/0404094 A1* | 12/2020 | Roderick .......... | H04M 3/42221 |
| 2021/0083865 A1* | 3/2021 | Obadia ................. | H04L 9/0852 |
| 2021/0119817 A1* | 4/2021 | DeLapa ................ | H04M 3/568 |
| 2021/0280171 A1* | 9/2021 | Phatak ................... | G10L 25/27 |
| 2022/0020387 A1* | 1/2022 | Paquier ........... | G10K 11/17885 |
| 2022/0393865 A1* | 12/2022 | Williams ............. | H04B 10/118 |
| 2024/0249728 A1* | 7/2024 | Khoury ................... | G10L 17/04 |
| 2025/0133323 A1* | 4/2025 | Mitchell ............... | H04R 1/1008 |
| 2026/0025460 A1* | 1/2026 | Ghosh ................. | H04M 3/2281 |

\* cited by examiner

400

402
RECEIVE BIOMETRIC INPUT

404
VOICEPRINT AUTHENTICATED?

YES

NO

406
GENERATE BIOMETRIC KEY FROM VOICEPRINT

414
SELECTIVELY NEUTRALIZE SOUND WAVES

408
DISTRIBUTE QUANTUM KEY VIA QUANTUM CHANNEL

416
STORE RECORD IN FRAUD DATABASE

410
GENERATE SESSION KEY FROM BIOMETRIC KEY AND QUANTUM KEY

412
ENCRYPT VoIP COMMUNICATION USING SESSION KEY

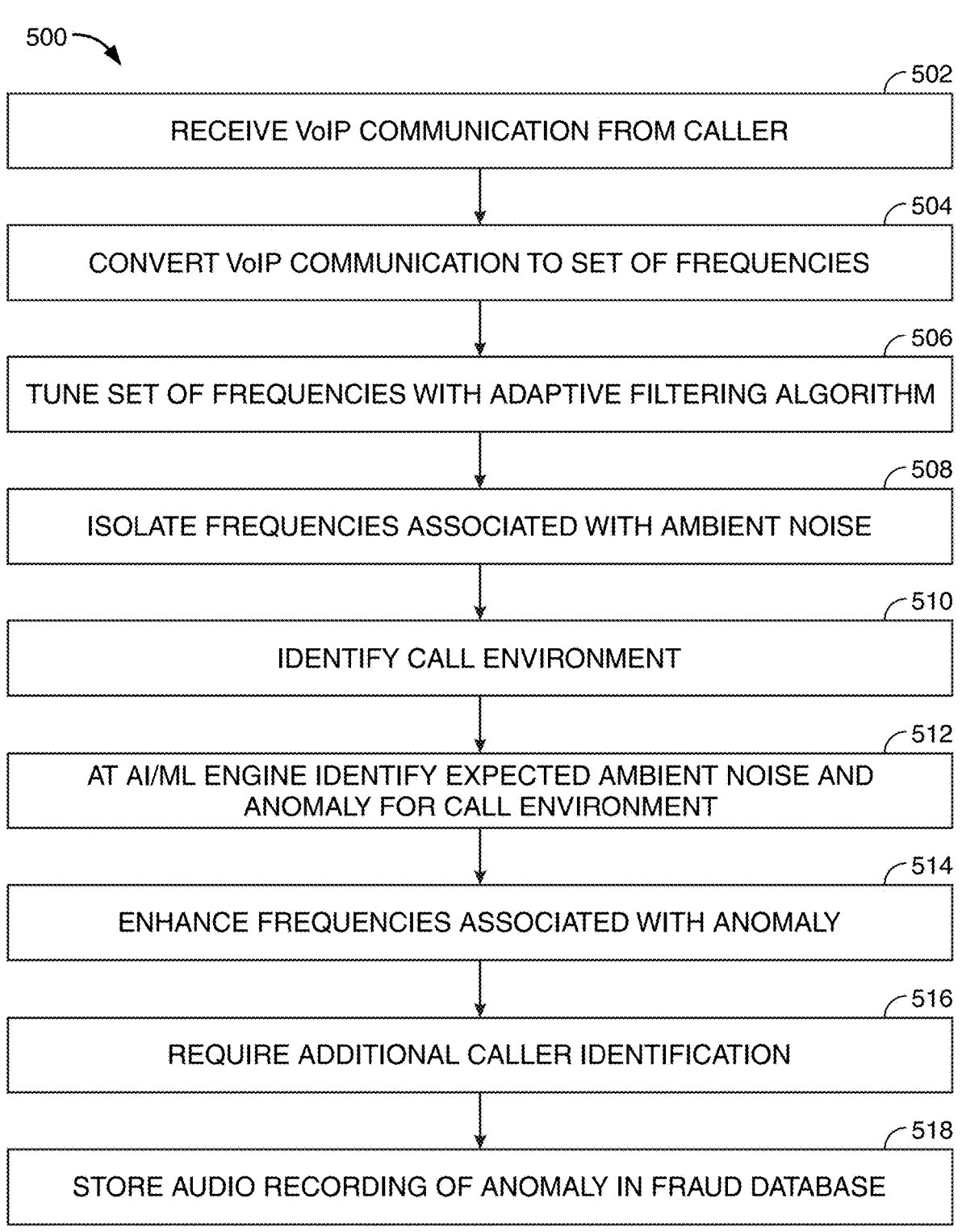

500

502
RECEIVE VoIP COMMUNICATION FROM CALLER

504
CONVERT VoIP COMMUNICATION TO SET OF FREQUENCIES

506
TUNE SET OF FREQUENCIES WITH ADAPTIVE FILTERING ALGORITHM

508
ISOLATE FREQUENCIES ASSOCIATED WITH AMBIENT NOISE

510
IDENTIFY CALL ENVIRONMENT

512
AT AI/ML ENGINE IDENTIFY EXPECTED AMBIENT NOISE AND ANOMALY FOR CALL ENVIRONMENT

514
ENHANCE FREQUENCIES ASSOCIATED WITH ANOMALY

516
REQUIRE ADDITIONAL CALLER IDENTIFICATION

518
STORE AUDIO RECORDING OF ANOMALY IN FRAUD DATABASE

FIG. 5

TOFFOLI GATE

601 — SYMBOL

603 — MATRIX FORM $$\begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 0 & 1 \\ 0 & 0 & 0 & 0 & 0 & 0 & 1 & 0 \end{pmatrix}$$

605 — TRUTH TABLE

| INPUT | | | OUTPUT | | |
|---|---|---|---|---|---|
| 0 | 0 | 0 | 0 | 0 | 0 |
| 0 | 0 | 1 | 0 | 0 | 1 |
| 0 | 1 | 0 | 0 | 1 | 0 |
| 0 | 1 | 1 | 0 | 1 | 1 |
| 1 | 0 | 0 | 1 | 0 | 0 |
| 1 | 0 | 1 | 1 | 0 | 1 |
| 1 | 1 | 0 | 1 | 1 | 1 |
| 1 | 1 | 1 | 1 | 1 | 0 |

FIG. 6A

ADAPTIVE QUANTUM-BASED VOICE OVER INTERNET PROTOCOL (VoIP) SECURITY

FIELD OF TECHNOLOGY

Aspects of the disclosure relate to VoIP security and fraud-prevention protocols.

BACKGROUND OF THE DISCLOSURE

Voice over Internet Protocol (VoIP) includes technologies for delivery of voice communication sessions over Internet Protocol (IP) networks. VoIP systems may be cloud-based and may connect desktop, mobile, and landline plans.

VoIP systems may be targeted by evolving cyber threats such as identity spoofing, voice forgery, and unauthorized access attacks. Traditional security methods, such as passwords and knowledge-based questions, place an increasing burden on the user. It would be desirable to implement adaptive security for a VoIP system that combines biometric authentication with quantum encryption to safeguard communication channels and ensure caller identity. It would further be desirable to implement these advanced security measures without placing additional requirements on the caller.

SUMMARY OF THE DISCLOSURE

Systems, methods, and apparatus are provided for adaptive, quantum-based, VoIP security.

A biometric input may be received from a VoIP caller. The input may be voice data from a VoIP communication. The VoIP system may generate a digital voiceprint from the voice data.

In response to failure to authenticate the voiceprint, the sound waves associated with the voiceprint may be neutralized. The specific soundwaves may be selectively cancelled out without terminating the VoIP communication. A record of the voiceprint may be stored in a fraud repository.

In response to authentication of the voiceprint, a biometric key may be generated based on the voiceprint. At a quantum processor, a quantum encryption key may be generated. Distribution of the quantum encryption key may include transmitting entangled qubits via a quantum channel.

A VoIP session key may be generated based on the biometric encryption key and the quantum encryption key. The VoIP communication may be encrypted with the VoIP session key.

An ambient sound associated with the VoIP communication may be isolated. In response to failure to authenticate the ambient sound, the caller may be required to provide an additional form of authentication.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 5 shows an illustrative process flow in accordance with the principles of the disclosure; and FIGS. 6A and 6B show illustrative process flows in accordance with the principle of the disclosure.

DETAILED DESCRIPTION

Figure 1:
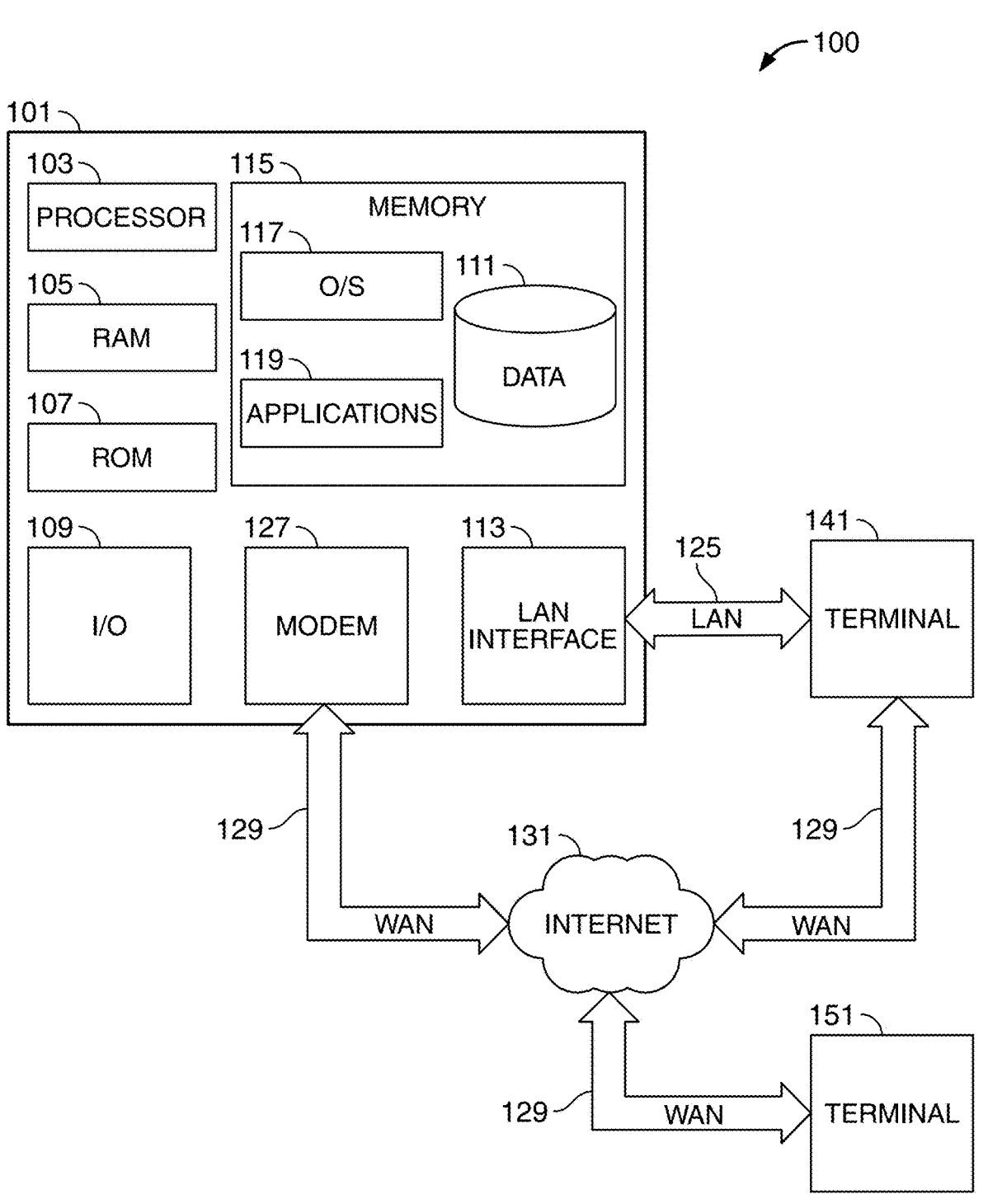
FIG. 1 shows illustrative apparatus in accordance with principles of the disclosure.

Systems, methods, and apparatus are provided for adaptive, quantum-based, VoIP security.

For the sake of illustration, the invention will be described as being performed by a "system." The system may include one or more features of apparatus and methods that are described herein and/or any other suitable device or approach.

The system may be a VoIP system. In some embodiments, the VoIP system may be a customer service system associated with an enterprise. The VoIP system may include an interactive voice response (IVR) system and/or one or more live agents. The IVR system may include one or more artificial intelligence/machine learning (AI/ML) algorithms.

The VoIP system may receive a communication from a caller. The communication may be initiated at a telephone network. The call may be initiated at a mobile device application, web portal, or any suitable network or device.

The system may include a classical (i.e., non-quantum) processor. The system may include a quantum processor.

Quantum computing may involve the use of quantum-mechanical phenomena such as superposition and entanglement to perform computations. The smallest bit in a quantum computer may be called a qubit.

The number and type of calculations that a quantum computer may be able to process may grow exponentially with the number of qubits included in the quantum computer's processing core. A quantum computer with "N" qubits may be able to simultaneously represent $2^n$ states. Therefore, two qubits may hold four states, three qubits may hold eight states, fifty qubits may hold 1, 125, 899, 906, 842, 624 states, and 10,000 qubits may hold $2^{10000}$ states.

Quantum processors are associated with vastly improved efficiencies over classical computers. Classical computers represent data in bits, with the values 0 or 1. Quantum processors use qubits which utilize superposition (i.e., the ability to be in multiple states at the same time until it measured) to allow for a state of 0, 1, or any probability of being 0 or 1.

The probabilities may be manipulated using matrix-based quantum gates, which are analogous to classical logic gates. Qubits are therefore able to represent many more data possibilities than a bit-based system of the same size. This allows for greater speed and less memory usage than classical systems.

A qubit in a state of superposition does not have a defined value because it may hold many potential values at the same time. When measured, the qubit wave function collapses to a defined state. When an entangled qubit is in a state of superposition, each of its entangled connections is also in a state of superposition. These combinations of uncertainties may exponentially increase the power of quantum computers.

The quantum processor may include a number of quantum threads. Each quantum thread may include a default number of quantum circuits. Quantum circuits, in turn, may refer to hardware and software based computational models that include quantum gates and are used for executing quantum computations.

In some embodiments, at least one of the quantum circuits may include a Toffoli gate. A feature of the Toffoli gate is its universal nature, i.e., it is able to represent classical computer operations as well as quantum operations. In some embodiments, at least one of the quantum circuits may include a Hadamard gate. A feature of the Hadamard gate is the ability to represent a superposition state.

The system may integrate biometric voice authentication with a quantum-enhanced VoIP security framework. This multi-layer system may improve both authentication and transmission protocols.

The VoIP security protocols may be dynamically adjusted based on real time fraud indications. The protocols may be implemented without requiring input from a caller or from an agent participating in the call.

The system may capture a caller voice input for biometric authentication. The system may capture the voice input in the course of conversational interactions within the system. In some embodiments the caller may be required to recite a specific phrase for analysis, such as a name or other identifier.

The system may use micro-electric mechanical system microphones or any suitable devices to capture the caller voice. The microphone array may be highly sensitive, with capability to capture subtle voice features such as frequency variation and intonation. A digital signal processor may convert the analog voice input to a digital waveform voiceprint.

Specialized digital processing chips may extract biometric features from the digital voiceprint. The features may include unique voice characteristics such as pitch, modulation, tone, and rhythm. These features may be unique to each individual and may form the basis of the voiceprint authentication.

The system may use pretrained deep learning models to process extracted features and generate a unique biometric voiceprint for the caller. The models may include a convolutional neural network (CNN), a recurrent neural network (RNN), and/or any suitable deep learning model. The deep learning models may be trained on datasets of voice samples to enable recognition and differentiation between different voices with a high degree of accuracy.

The system may generate a caller voiceprint in real time during a VoIP communication. The system may compare the voiceprint to stored voiceprints. The system may use cosine similarity, Euclidean distance and/or any suitable metric to determine a match between the caller voiceprint and a stored voiceprint. Cosine similarity may measure the cosine of angle between two vectors representing the voiceprints to determine a match. Euclidean distance may measure a distance between the voiceprints.

The system may include a predetermined threshold. The threshold may be adjusted by a system administrator, by AI/ML algorithms, or by any suitable party or protocol. The system may determine if a distance or percentage match between the caller voiceprint and the stored voiceprint exceeds the predetermined threshold.

If the match meets or exceeds the threshold, the caller identity may be authenticated. If the match is below the threshold, the VoIP communication may be flagged for fraud.

When a communication is flagged for fraud, the system may implement a range of responses. The system may require an additional form of authentication from the caller, such as a social security number, passcode, historical interaction data, and/or any other suitable information. The caller may be automatically prompted to provide the additional information. In some embodiments, the system may alert a live agent, system administrator, or any suitable party. The live agent may be prompted to request additional information from the customer.

When a communication is flagged for fraud, the system may require review of the communication. The review may be conducted by a live agent, system administrator, or any suitable party. In some embodiments, the system may initiate voice cancellation protocols as set forth below.

When a caller identity is authenticated, the system may generate a unique biometric encryption key from the digital voiceprint. The system may use a key derivation function or any suitable algorithm to generate the biometric encryption key. The algorithm may take the biometric features as input. The biometric encryption key may serve as a secure representation of caller identity. The biometric encryption key may be used to encrypt the VoIP communication. The biometric encryption key may be synchronized with a quantum encryption key as set forth below.

The system may initiate quantum key distribution (QKD). QKD may enable two parties to share a random, secret key which can be used to encrypt and decrypt the VoIP communication. The encryption key data may be generated by a quantum processor and transmitted via a quantum channel.

The system may initiate QKD in response to initiation of a VoIP communication. The system may initiate QKD in response to preliminary authentication protocols such as entry of a passcode. The system may initiate QKD in response to biometric voiceprint authentication as described above.

The quantum encryption key may be generated using qubits to encode information in a quantum state. The qubits may be any suitable type of qubit using any suitable technology. The qubits may include photons in a state of quantum superposition or quantum entanglement as set forth above. Photonic qubits may utilize the quantum properties of photons for quantum computation. Quantum information is encoded in properties of photons such as polarization and phase. Photonic quantum computers may be able to operate at room temperature.

A quantum encryption key may be uniquely secure from misappropriation by bad actors. In quantum mechanics, observing or measuring a quantum system disturbs the system and changes the quantum state. In entanglement-based protocols, performing a measurement on one qubit affects the other. If an entangled pair is shared between two parties, intercepting either piece alters the overall system. Thus, a bad actor attempting to interact with the key during transmission may introduce detectable anomalies. In response to detection of anomalies, the VoIP system may replace the quantum encryption key with a new quantum encryption key.

A quantum processor may generate and/or detect quantum entangled particles using photon generators, single photon detectors and/or any suitable technology. Photons may be transmitted via a quantum communication channel.

Quantum processors may measure features of the entangled particles such as polarization and phase. If there has been no interference during transmission, both parties will possess an identical key. Keys may be tuned using error correction algorithms to correct any differences caused by quantum noise.

If the photons in the quantum encryption key are disturbed during transmission, the key distribution process will reveal mismatches in the measurement data. A mismatch may alert the system to the presence of an eavesdropper.

System may discard the compromised key and start over with a new set of entangled photons.

The system may include a central server. The central server may manage the QKD. The central server may manage distribution of the quantum encryption key to a caller, a VoIP system, system agents, and/or any suitable party.

In some embodiments, the quantum encryption key may be used to encrypt communications between the caller and the VoIP system. In some embodiments, the quantum encryption key may be used to encrypt a communication after it is received at the VoIP system. The VoIP system may use the quantum encryption key for internal communications with system agents, transmission to other systems, secure storage, and/or any other suitable purpose.

The biometric encryption key may be synchronized with the quantum encryption key. The synchronization may ensure that the identity of the caller and transmission of the communication are both verified and secure.

The system may use a key derivation function such as a hashing function. The key derivation function may take both the biometric encryption key and the quantum encryption key as input. The key derivation function may output a session encryption key. The session encryption key may be used to encrypt the VoIP communication. This protocol may merge both identity authentication (biometric key) and encryption (quantum key) into a single secure key that is unique to each session.

In some embodiments, the biometric encryption key and the quantum encryption key may be synchronized using an XOR operator. The XOR operator may read the keys together to integrate the two keys and inform the final session key.

Both the biometric encryption key and the quantum encryption key may be required in order to recreate the session key and decrypt the VoIP communication. The biometric key may be generated for each interaction. Similarly, the quantum key may be unique for each communication. As such, the session key may not be reused across multiple sessions, rendering it extremely secure.

The VoIP system may include ambient sound analysis. Ambient sound analysis may supplement biometric authentication protocols in verifying caller identity.

The system may monitor background noise during a communication from a caller. Background noise may be compared to expected environmental noise patterns to detect identity spoofing and fraud.

The system may use an array of microphones to capture ambient background noise during the communication. The system may include a dedicated spectrum analyzer. The spectrum analyzer may process ambient sounds by breaking them down into their frequency components.

The system may differentiate between different environments based on their ambient background noise. For example, the system may determine that the caller is in an indoor environment such as an office, or an outdoor environment, such as a city street or natural setting. The system may use road noise or traffic noise to determine that the caller is in a vehicle.

The system may use AI/ML models to detect anomalies in ambient sounds. AI/ML models may include generative AI, recurrent neural networks (RNNs), Hidden Markov Models, and/or any suitable models. The AI/ML models may be trained on environmental sound datasets to recognize expected background noises. Expected background noise may be determined based on actual location data, customer provided location data, and/or previous call histories. The ambient background noise captured in the call may be compared to historical sound profiles stored in the system. If the sound environment associated with the call does not match an expected profile the call may be flagged for fraud.

When a communication is flagged for fraud, the system may implement a range of responses. The system may require an additional form of authentication from the caller, such as a social security number, passcode, historical interaction data, and/or any other suitable information. The caller may be automatically prompted to provide the additional information. In some embodiments, the system may alert a live agent, system administrator, or any suitable party. The live agent may be prompted to request additional information from the customer. The system may require review of the communication. The review may be conducted by a live agent, system administrator, or any suitable party. In some embodiments, the system may initiate voice cancellation protocols as set forth below.

The ambient sound components may be tuned using an adaptive filtering algorithm. Noises appropriate to the expected caller environment may be tuned out and unexpected background sounds may be highlighted. For example, in the case of bad actors operating in a large call center warehouse, other calls being conducted in the background may be detected. The system may record unexpected background sounds in a fraud file.

In response to a determination of fraud, the system may initiate reverse frequency cancellation protocols. These protocols may neutralize fraudulent voices detected during a call. The system may generate sound waves that cancel out specific identified voice patterns in real time and allow legitimate conversation to proceed without interruption.

The system may use real time audio processors. The audio processors may include a spectrum analyzer. The audio processers may run algorithms to break down incoming audio signals into constituent frequencies and enable precise voice signal detection. Algorithms may include fast Fourier transform or any suitable algorithm. Algorithms may convert a signal from the original domain into a frequency domain to break down complex audio signals into basic frequency components.

The system may include a database storing known fraudulent voice patterns. The system may use voiceprint analysis to compare incoming voices to known fraudulent voices. The system may use any suitable AI/ML algorithms for the determination.

In some embodiments, the database may also store known scripts used by bad actors. The scripts may be stored as audio recordings or may be converted to text using any suitable algorithms. The system may use voice to text analysis to compare incoming voice content to known fraudulent scripts. The system may use any suitable AI/ML algorithms for the determination.

The system may store a script used by a fraudulent caller as an audio recording or as text. The system may use any suitable audio to text conversion algorithms for the script.

In response to a flagged call, the system may activate voice frequency cancellation. The system may neutralize a fraudulent voice by generating inverse sound waves with the same amplitude but the opposite phase. The inverse sound waves may be specifically targeted to cancel the fraudulent voice.

The system may use low latency sound wave generators to generate the inverse frequency in real time. The system may disrupt fraudulent communications without affecting the voice of a legitimate user such as a live agent.

The fraudulent caller may be unaware of the cancellation and may continue to provide information that may be used for future fraud detection and/or for enforcement action. The system may continue to record background voices using ambient sound analysis as described above. For example, in the case of a call center warehouse with many bad actors, the system may record background activity to expand the database of fraudulent voiceprints. Based on the information collected, the system may alert a live agent or system administrator. The system may alert security forces or other enforcement authorities.

One or more non-transitory computer-readable media storing computer-executable instructions are provided. When executed by a processor on a computer system, the instructions may perform a method for adaptive VoIP security.

The method may include receiving a biometric input associated with a VoIP communication. The biometric input may be voice data gathered from the communication. The method may include generating a digital voiceprint from the voice data.

The method may include, in response to failure to authenticate the voiceprint, selectively neutralizing sound waves associated with the voiceprint. The sound waves may be neutralized without terminating the VoIP communication. The method may include storing a record of the voiceprint in a fraud repository.

The method may include in response to authentication of the voiceprint, encrypting the VoIP communication. The method may include generating a biometric encryption key based on the voiceprint. The method may include generating a quantum encryption key involving a pair of entangled qubits at a quantum processor. The method may include distributing the quantum encryption key via a quantum channel. A VoIP session key may be generated using the biometric encryption key and the quantum encryption key as inputs. The session key may be used to encrypt the VoIP communication.

The method may include isolating an ambient sound associated with the VoIP communication. The method may include, in response to failure to authenticate the ambient sound, requiring an additional form of verification.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
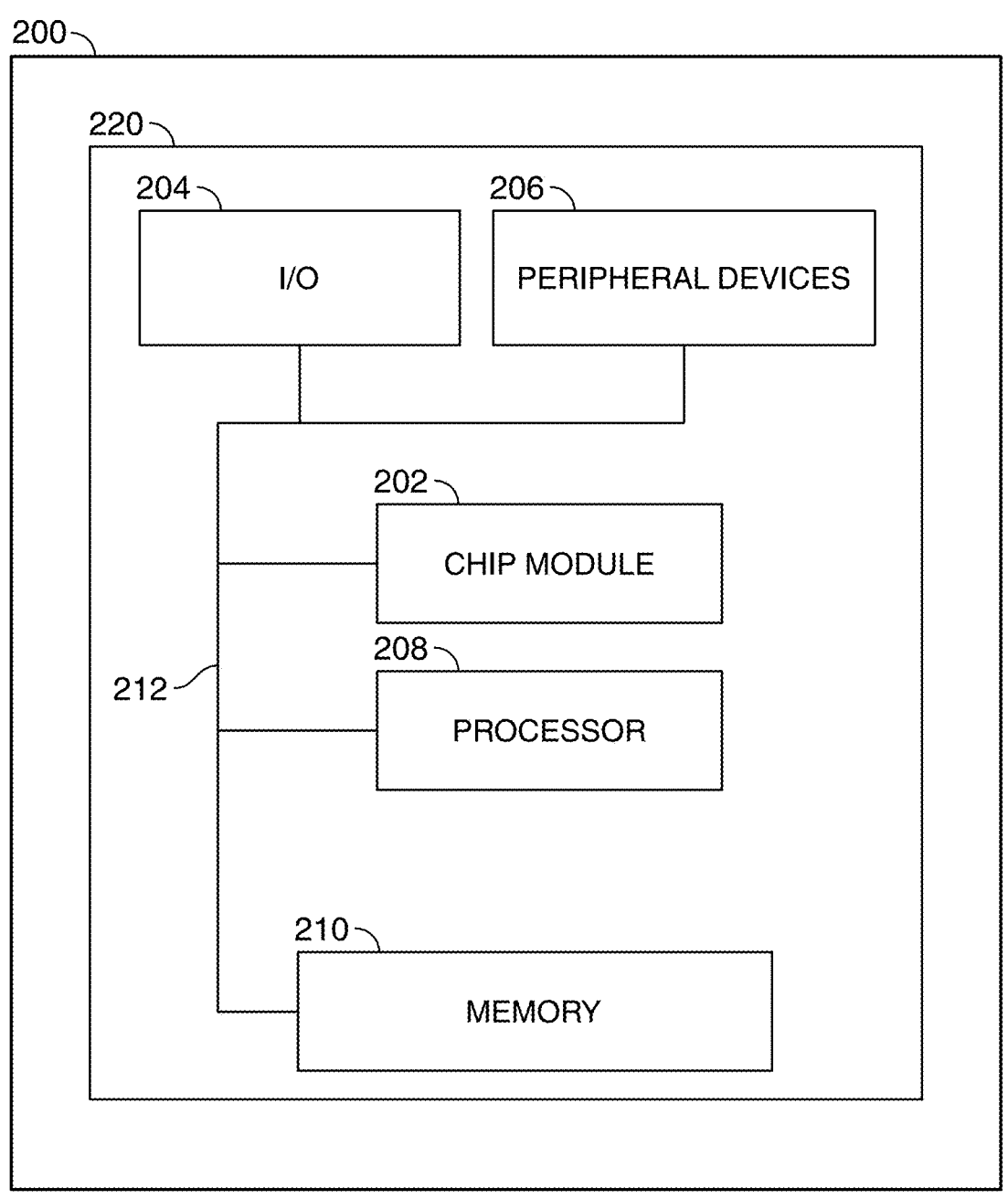
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
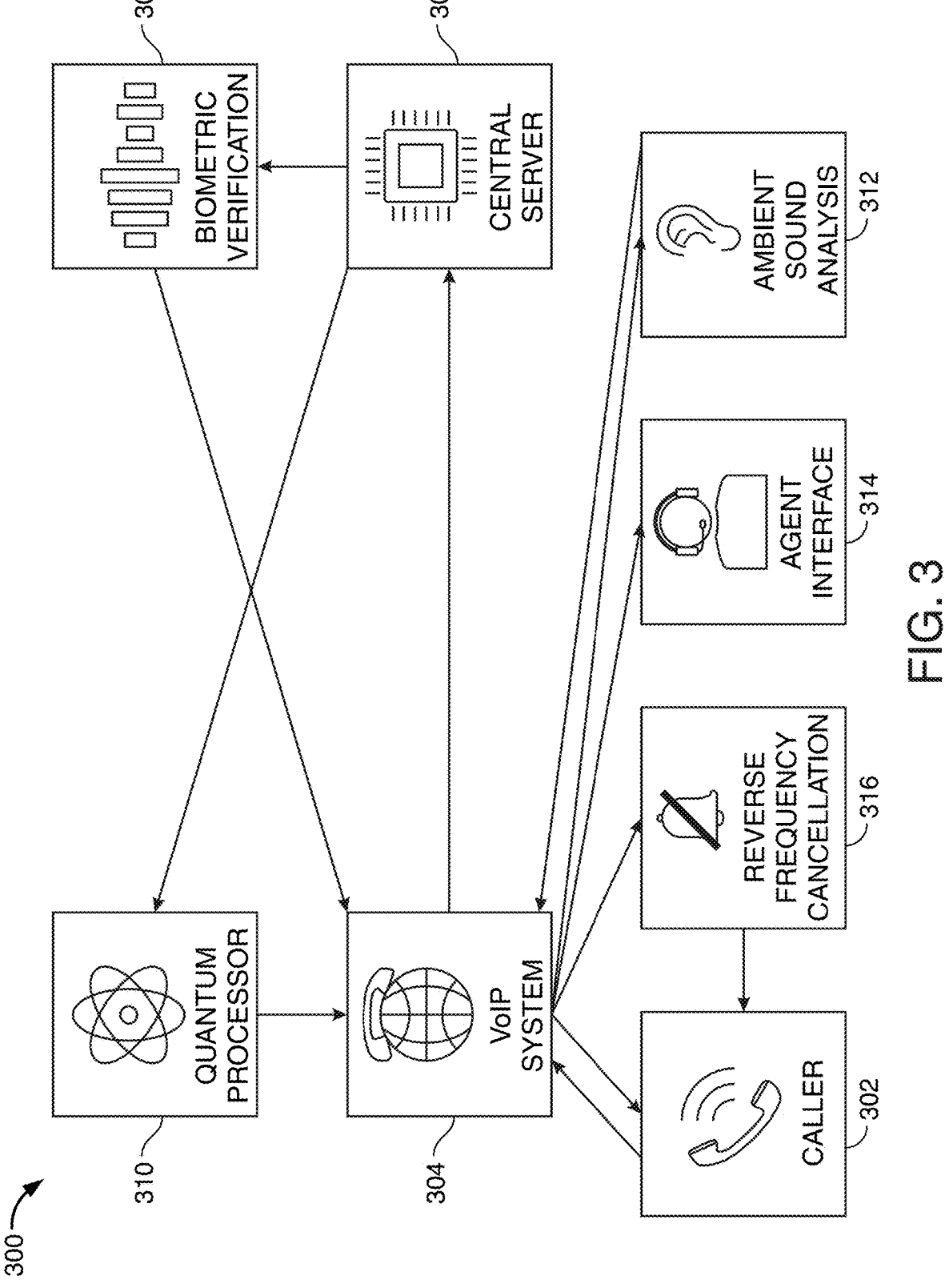
FIG. 3 shows an illustrative process flow in accordance with principles of the disclosure.

FIG. 3 shows illustrative process flow 300 for adaptive, quantum-based VoIP security. At 302, a caller may communicate with VoIP system 304. The call may be initiated at a telephone, a mobile device, a web portal, or at any suitable device or system.

VoIP system 304 may collect voice data from caller 302. VoIP system 304 may communicate with central server 306. Central server 306 may manage quantum key distribution at quantum processor 310 and biometric voiceprint analysis 308. VoIP system 304 may use a session key derived from a biometric key and quantum key to encrypt communications with caller 302.

At 312, ambient sound analysis may match frequencies in the VoIP communication with expected and anomaly background sounds. At 314, VoIP system 304 may send real time alerts or other communications to live agent interface 314.

At 316, in response to detection of fraud, reverse frequency cancellation may neutralize a voice that is associated with fraud. The caller may not be aware that their voice has been silenced and may continue the call. VoIP system 304 may continue to record other voices or sounds associated with the communication. In some embodiments, VoIP system may terminate the call completely in response to detection of fraud.

Figure 4:
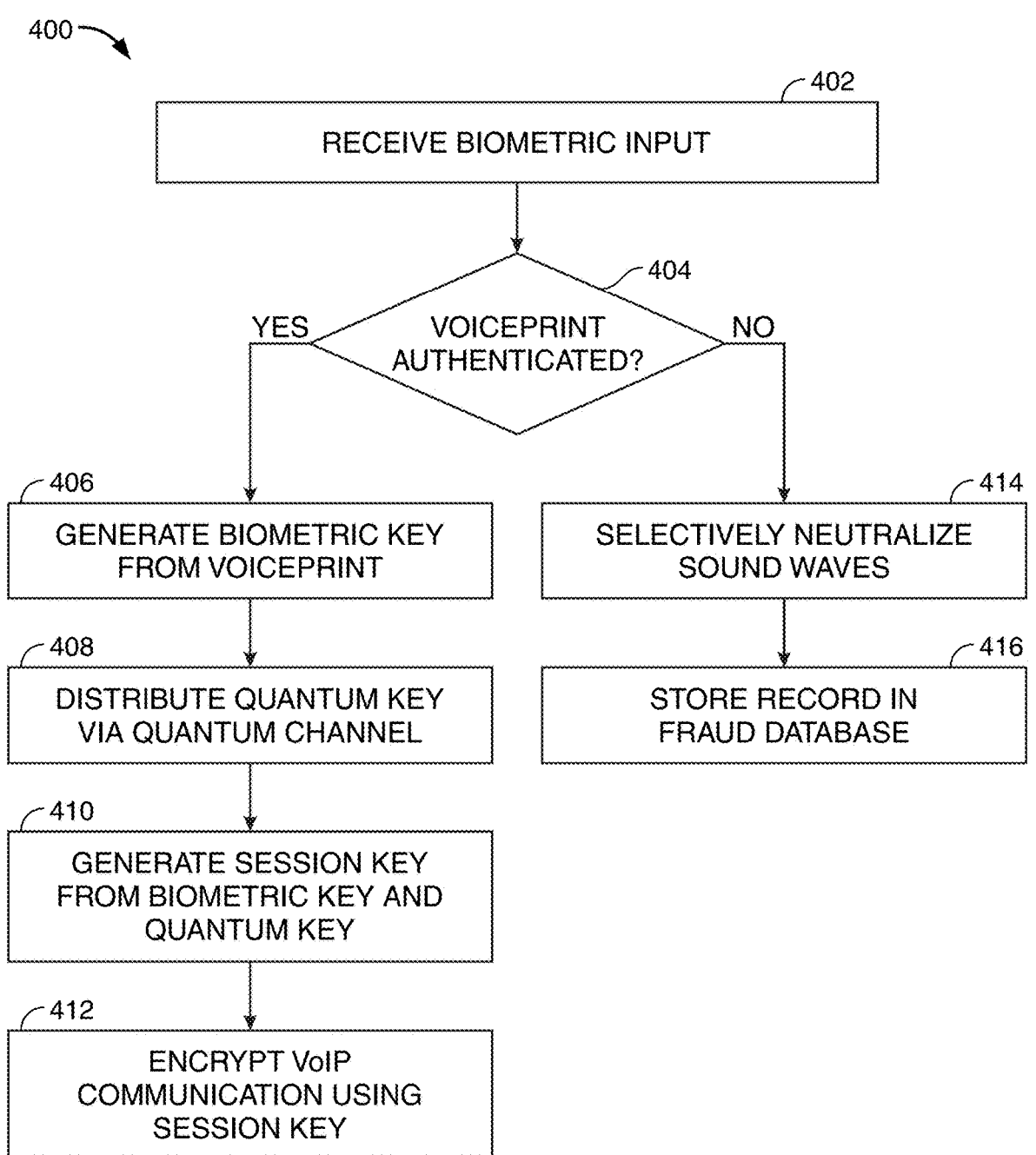
FIG. 4 shows an illustrative process flow in accordance with principles of the disclosure.

FIG. 4 shows illustrative process flow 400 for adaptive, quantum-based VoIP security. At 402, a VoIP system may receive a biometric input from a caller. The input may be received in the course of a VoIP communication, i.e. substantially independent of any special actions by the caller. At 404, a voiceprint derived from the input may be authenticated. Features such as cadence, pitch, and tone may be extracted from the voiceprint for comparison to a known voiceprint stored in a database.

If the voiceprint is authenticated, the process may proceed with steps 406-412. At 406, the system may generate a biometric encryption key from the voiceprint. At 408, the system may distribute a quantum encryption key via a quantum channel. At 410, the system may synchronize the biometric encryption key and the quantum encryption key to generate a session key. At 412, the VoIP communication may be encrypted using the session key.

If the voiceprint is not authenticated, the process may proceed with steps 414-416. At 414, the system may selectively neutralize sound waves associated with a fraudulent voice while allowing the communication to continue. At 416, a voiceprint generated from the fraudulent voice along with any other suitable call data may be stored in database.

FIG. 5 shows illustrative process flow 500 for VoIP system ambient sound analysis. At 502, the VoIP system may receive a VoIP communication from a caller. At 504, the system may convert the VoIP communication to a set of frequencies. At 506, the system may tune the set of frequencies using an adaptive filtering algorithm and at 508, may isolate frequencies associated with ambient noise.

At 510, the system may identify a call environment using caller provided data, GPS or other location data, background noise, call content, caller history, or any suitable factors. At 512, an AI/ML model may identify frequencies associated with expected ambient noise and frequencies associated with an anomaly in the ambient noise. At 514, the system may enhance frequencies associated with the anomaly.

In response to detection of an anomaly, at 516, the VoIP system may require an additional form of caller identification. At 518, an audio recording of the anomaly may be stored in a fraud repository.

Figure 6B:
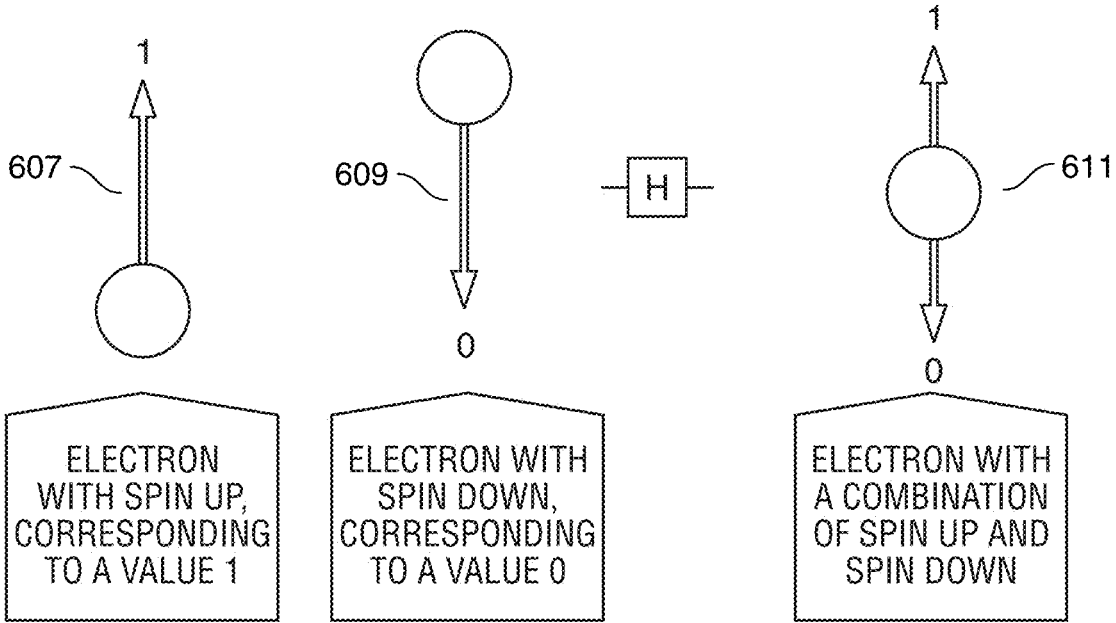

FIGS. 6A-6B show illustrative diagrams of exemplary quantum gates in accordance with principles of the disclosure. FIG. 6A shows symbol 601, matrix form 603, and truth table 605 of a Toffoli gate. A Toffoli gate is a universal reversible logic gate, which means that it enables simulation of any classical reversible circuit. In operation, as seen in truth table 605, the exemplary Toffoli gate has a 3-bit input and a 3-bit output. The first two output bits mirror the first two input bits. The third bit stays the same unless the first two input bits are both set to 1—in which case the third output bit is inverted from the third input bit. The Toffoli gate may therefore also be known as the "controlled-controlled-not" gate.

FIG. 6B shows representations of a Hadamard gate. Symbol 607 shows a representation of electron spin up, which corresponds to the value 1. Symbol 609 shows a representation of electron spin down, which corresponds to the value 0. Symbol 611 shows a representation of electron spin up and down, which corresponds to the value that represents a superposition of 1 and 0.

Thus, methods and apparatus for ADAPTIVE QUANTUM-BASED VoIP SECURITY are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for adaptive VOIP security, the method comprising:
receiving a biometric input comprising a voiceprint associated with a VOIP communication;
in response to failure to authenticate the voiceprint:
neutralizing sound waves associated with the voiceprint without terminating the VOIP communication; and
storing a record of the voiceprint in a fraud repository;
in response to authentication of the voiceprint:
generating a biometric encryption key based on the voiceprint;
at a quantum processor, generating a quantum encryption key comprising entangled photonic qubits;
based on input of the biometric encryption key and the quantum encryption key, generating a VoIP session key;
encrypting the VOIP communication with the VOIP session key;
isolating an ambient sound associated with the VOIP communication; and

in response to failure to authenticate the ambient sound, requiring an additional form of verification.

2. The method of claim 1, wherein authentication of the voiceprint comprises:
converting an analog audio signal to a digital voiceprint;
extracting voiceprint features comprising pitch, modulation, tone, and rhythm from the digital voiceprint; and
matching the voiceprint features to stored voiceprint features in an authentication database.

3. The method of claim 1, wherein neutralizing the sound waves comprises:
converting an audio signal into a set of frequencies;
identifying a frequency associated with an unauthenticated voiceprint; and
generating an inverse sound wave with the same amplitude and an opposite phase to the frequency associated with the unauthenticated voiceprint without affecting other frequencies in the set of frequencies.

4. The method of claim 3, wherein the inverse sound waves are generated at a low latency wave generator in real time.

5. The method of claim 1, wherein generating the quantum encryption key further comprises:
activating quantum key distribution protocols at a central server associated with the VOIP system;
distributing the quantum encryption key via a quantum channel; and
tuning the quantum encryption key using an error correction algorithm to correct for quantum noise.

6. The method of claim 1, wherein generating the VOIP session key comprises using both the biometric encryption key and the quantum encryption key as inputs to a key derivation function.

7. The method of claim 6 wherein the key derivation function is an XOR operator.

8. The method of claim 1, wherein isolating the ambient sound comprises:
converting the ambient sound into a set of frequencies;
tuning the set of frequencies using an adaptive filtering algorithm;
at one or more AI/ML models, identifying an expected ambient sound and an anomaly sound in the set of frequencies;
filtering a frequency associated with the expected ambient sound and enhancing a frequency associated with the anomaly sound; and
storing an audio recording of the anomaly sound in a fraud repository.

9. The method of claim 1, wherein the expected ambient sound comprises one of office sounds, street sounds, vehicle sounds, and nature sounds.

10. One or more non-transitory computer-readable media storing computer-executable instructions which, when executed by a processor on a computer system, perform a method for adaptive VOIP security, the method comprising:
receiving a biometric input comprising a voiceprint associated with a VOIP communication;
in response to failure to authenticate the voiceprint:
neutralizing sound waves associated with the voiceprint without terminating the VOIP communication; and
storing a record of the voiceprint in a fraud repository;
in response to authentication of the voiceprint:
generating a biometric encryption key based on the voiceprint;
generating a quantum encryption key comprising entangled photonic qubits;

generating a VOIP session key based on input of the biometric encryption key and the quantum encryption key;

encrypting the VOIP communication with the VOIP session key;

isolating an ambient sound associated with the VOIP communication; and in response to failure to authenticate the ambient sound, requiring an additional form of verification.

11. The media of claim 10, wherein authentication of the voiceprint comprises:

converting an analog audio signal to a digital voiceprint;

extracting voiceprint features comprising pitch, modulation, tone, and rhythm from the digital voiceprint; and matching the voiceprint features to stored voiceprint features in an authentication database.

12. The media of claim 10, wherein neutralizing the sound waves comprises:

converting an audio signal into a set of frequencies;

identifying a frequency associated with an unauthenticated voiceprint; and generating an inverse sound wave with the same amplitude and an opposite phase to the frequency associated with the unauthenticated voiceprint without affecting other frequencies in the set of frequencies.

13. The media of claim 10, wherein generating the quantum encryption key further comprises:

activating quantum key distribution protocols at a central server associated with the VOIP system;

distributing the quantum encryption key via a quantum channel; and tuning the quantum encryption key using an error correction algorithm to correct for quantum noise.

14. The media of claim 10, wherein generating the VOIP session key comprises using both the biometric encryption key and the quantum encryption key as inputs to a key derivation function.

15. The media of claim 10, wherein isolating the ambient sound comprises:

converting the ambient sound into a set of frequencies;

tuning the set of frequencies using an adaptive filtering algorithm;

at one or more AI/ML models, identifying an expected ambient sound and an anomaly sound in the set of frequencies;

filtering a frequency associated with the expected ambient sound and enhancing a frequency associated with the anomaly sound; and storing an audio recording of the anomaly sound in a fraud repository.

16. A system for adaptive VOIP security, the system comprising:

a quantum processor configured to generate a quantum encryption key comprising entangled qubits photonic qubits;

a processor associated with a VoIP system configured to:

receive a biometric input comprising a voiceprint associated with a VOIP communication;

in response to failure to authenticate the voiceprint:

neutralize sound waves associated with the voiceprint without terminating the VOIP communication; and store a record of the voiceprint in a fraud repository;

in response to authentication of the voiceprint:

generate a biometric encryption key based on the voiceprint;

generate a VOIP session key based on input of the biometric encryption key and the quantum encryption key; and encrypt the VOIP communication with the VOIP session key;

isolate an ambient sound associated with the VOIP communication; and in response to failure to authenticate the ambient sound, require an additional form of verification.

17. The system of claim 16, wherein authentication of the voiceprint comprises:

converting an analog audio signal to a digital voiceprint;

extracting voiceprint features comprising pitch, modulation, tone, and rhythm from the digital voiceprint; and matching the voiceprint features to stored voiceprint features in an authentication database.

18. The system of claim 16, wherein neutralizing the sound waves comprises:

converting an audio signal into a set of frequencies;

identifying a frequency associated with an unauthenticated voiceprint; and generating an inverse sound wave with the same amplitude and an opposite phase to the frequency associated with the unauthenticated voiceprint without affecting other frequencies in the set of frequencies.

19. The system of claim 16, wherein generating the quantum encryption key further comprises:

activating quantum key distribution protocols at a central server associated with the VOIP system;

distributing the quantum encryption key via a quantum channel; and tuning the quantum encryption key using an error correction algorithm to correct for quantum noise.

20. The system of claim 16, wherein synchronizing the biometric encryption key with the quantum encryption key comprises using both the biometric encryption key and the quantum encryption key as inputs to a key derivation function.

21. The system of claim 16, wherein isolating the ambient sound comprises:

converting the ambient sound into a set of frequencies;

tuning the set of frequencies using an adaptive filtering algorithm;

at one or more AI/ML models, identifying an expected ambient sound and an anomaly sound in the set of frequencies;

filtering a frequency associated with the expected ambient sound and enhancing a frequency associated with the anomaly sound; and storing an audio recording of the anomaly sound in a fraud repository.

* * * * *